United States Patent [19]

Voillat

[11] Patent Number: 5,367,286
[45] Date of Patent: Nov. 22, 1994

[54] SYSTEM FOR INSTANTANEOUSLY DISPLAYING THE RANKING OF A COMPETITOR IN A RACE WITH SEQUENTIAL STARTS

[75] Inventor: Jean-Pierre Voillat, Bassecourt, Switzerland

[73] Assignee: Swiss Timing Ltd., St.-Imier, Switzerland

[21] Appl. No.: 952,718
[22] PCT Filed: Mar. 13, 1992
[86] PCT No.: PCT/CH92/00052
§ 371 Date: Nov. 23, 1992
§ 102(e) Date: Nov. 23, 1992
[87] PCT Pub. No.: WO92/17862
PCT Pub. Date: Oct. 15, 1992

[30] Foreign Application Priority Data

Apr. 2, 1991 [CH] Switzerland ............. 00971/91
May 16, 1991 [FR] France ................ 91 05994

[51] Int. Cl.$^5$ .............................. G08B 23/00
[52] U.S. Cl. ................ 340/323 R; 348/589; 364/411
[58] Field of Search ........ 340/323 R; 364/410, 364/411, 412, 569; 273/86 R; 358/22, 183, 335, 337, 345; 346/107 B; 235/1 B, 91 D; 368/3, 9, 10; 434/253, 255; 348/600, 589, 563, 564, 565, 77; 377/5

[56] References Cited

U.S. PATENT DOCUMENTS

| | | | |
|---|---|---|---|
| 3,546,696 | 12/1970 | Waters et al. | 340/933 |
| 3,946,312 | 3/1976 | Oswald et al. | 273/86 R |
| 4,523,204 | 6/1985 | Bovay | 358/108 |
| 4,752,764 | 6/1988 | Peterson et al. | 340/323 R |
| 4,774,582 | 9/1988 | Hakamada et al. | 358/183 |
| 4,843,483 | 6/1989 | Bogner | 358/335 |
| 5,103,433 | 4/1992 | Imhof | 346/107 B |
| 5,105,395 | 4/1992 | Imhof | 346/107 B |

FOREIGN PATENT DOCUMENTS

0252215 of 0000 European Pat. Off. .
0230787 8/1987 European Pat. Off. .

OTHER PUBLICATIONS

Die Uhu—Uhren, Juwelen, Schmuch, No. 1, 20 Jan. 1981, Bielefeld BRD p. 42; 'Das Zeitmessystem der alpinen Skiwettkampfe'.
Funkschau, No. 21, 6 Oct.1989, Munchen De pp. 53-55; Kusch: 'Die nachste Generation'.

*Primary Examiner*—Brent A. Swarthout
*Attorney, Agent, or Firm*—Pollock, Vande Sande & Priddy

[57] ABSTRACT

The display system includes a device for memorizing the time when each competitor ($C_i$) in a sequential start race passes a detector ($D_k$); a device (12) for classifying competitors ($C_j$) as they pass each detector ($D_k$) to establish for each detector ($D_k$) a list of competitors according to their time; and a processing device (20) which operates when a competitor ($C_i$) passes a detector ($D_k$): to determine the instantaneous ranking of competitor ($C_i$) reaching the detector ($D_k$) by comparing his time of passage with the times of passage of a plurality of previously classified competitors ($C_j$), to calculate the time differences R and A between the time of passage of competitor ($C_i$) and the times of passage of competitors ($C_j$) of immediately adjacent rankings, to convert each time difference R and A into a distance using a conversion function f, and to display, in a predetermined display area (28), a symbol (30) representing competitor ($C_i$) and symbols (32, 34) representing each of the competitors ($C_j$) of immediately adjacent rankings, while spacing their symbols (32, 34) apart as a function of the calculated distances.

12 Claims, 4 Drawing Sheets

SYSTEM FOR INSTANTANEOUSLY DISPLAYING THE RANKING OF A COMPETITOR IN A RACE WITH SEQUENTIAL STARTS

FIELD OF THE INVENTION

The instant invention relates to a system for instantaneously displaying the ranking of a competitor in a race with sequential starts. This system can be used in competitions such as, for example, an alpine ski race, an automobile rally, a bicycle race against the clock, or the like.

BACKGROUND OF THE INVENTION

In the following description the situation of an alpine ski race has been taken as an example, it being understood that the invention is in no way limited to this particular application.

During an alpine ski race, photoelectric detectors are set up on the piste to determine the instant each competitor passes a few specific points of the course. Two to three detectors are normally used, one of the detectors naturally being placed on the finishing line and the other detectors being distributed between the starting line and the finishing line to measure the times of intermediate passage of each competitor. These times of passage are sent to a timing installation where they are memorized and processed. By comparing the time the skier on the piste passes in front of a detector with the times of passage of preceding skiers it is possible to instantaneously determine the ranking of the skier on the piste at the moment he passes in front of this detector. The ranking, the time of passage and the difference from the best time are displayed in digital form on the one hand on a display board located near the finishing line and, on the other hand, blended into the image received by the television audience.

This display system makes it possible to give the public instantaneously some indication regarding the performance of the skier on the piste. However this information remains very limited because only one or two intermediate passage times are measured.

It would be possible to try to make the display system more attractive to the public by increasing the number of detectors placed on the piste since this would make it possible to follow the development of the ranking of the skier on the piste more precisely. However, it would not be easy for the public to follow this development because of the type of display used. What the public would, in fact, receive would be a series of digital items of information giving the development of the ranking of the skier on the piste with a frequency that would increase in proportion to the number of detectors. It may be imagined that presentation of this kind would be extremely impractical and of little informative value to the public.

There is therefore no point in trying to make the development in the ranking of the skier on the piste more accurate by using the display methods of the state of the art. It is, however, clear that to increase the public appeal of races in which competitors set off one behind the other, it is desirable to inform the public as accurately as possible of the development of the instantaneous ranking of each competitor.

It is an object of the invention to meet this need. In a very general manner, the invention consists in resorting to a display of the analog type in place of the digital display referred to hereinabove.

More specifically, it is an object of the invention to provide a system for instantaneously displaying the ranking of a competitor in a race with sequential starts comprising:

memorization means of the time of passage of each competitor $C_j$, $1 \leq j \leq n$, in front of a detector $D_k$, $1 \leq k \leq m$, means for classifying the competitors as they pass each detector to establish, for each detector, a list of competitors according to their times, which comprises, inter alia;

a processing means for, during the time a competitor $C_i$ passes in front of a detector $D_k$:

determining the instantaneous ranking of the competitor $C_i$ reaching the detector $D_k$ by comparing his time of passage with the times of passage of a plurality of already classified competitors, calculating the time differences R and A between the time of passage of competitor $C_i$ and the times of passage of the competitors with immediately adjacent rankings, converting each time difference R and A into a distance using a conversion function f, displaying in a predetermined display area a symbol representing the competitor $C_i$ and symbols representing each of the competitors of the immediately adjacent rankings by spacing their symbols out as a function of the distances calculated.

This display system has the advantage of informing the public of the position of a competitor in the race in relation to competitors who have already finished in a form that is very easy to interpret visually. This form of display gives the public less complete information than the digital display of the ranking and of the time while the competitor passes in front of the detector, but in contrast it constitutes a much more informative representation of the position of a competitor in relation to his fellow contestants. What is more, it is possible to add a conventional digital display to the display system of the invention.

BRIEF DESCRIPTION OF THE DRAWINGS

The features and advantages of the invention will be better understood with reference to the following description, given solely by way of non-limiting example, with reference to the appended drawings, in which.

DETAILED DESCRIPTION OF THE INVENTION

Figure 1:
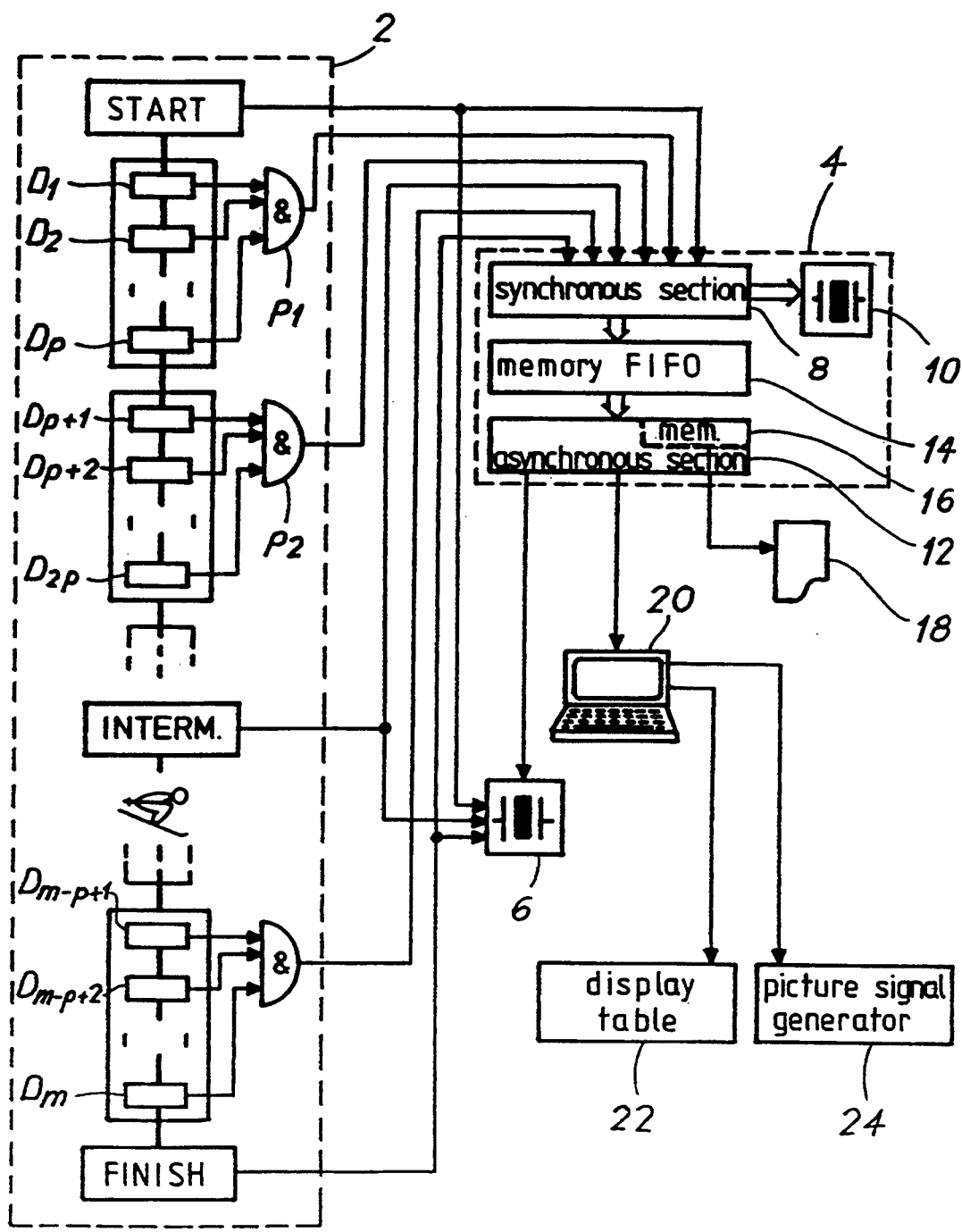
FIG. 1 shows diagrammatically a timing installation for a ski race having the display system of the invention.

FIG. 1 shows in diagrammatic form a timing installation of the type used to time an alpine ski race. This installation has an acquisition module 2, a processing module 4, a clock 6 and various printing and display means.

The acquisition module 2 is essentially composed of a plurality of detectors $D_k$, $1 \leq k \leq m$. These detectors are generally photoelectric cells, except possibly for the departure detector which is typically a contact detector. In a conventional timing installation the number of detectors is generally limited to a "start" detector, a "finish" detector and to one or two intermediate detectors for measuring the intermediate passage time of the competitors. In contrast, the timing installation shown in FIG. 1 has a large number of detectors so as to be able to follow the development in the ranking of the competitor on the piste more precisely. The number of detectors used is chosen as a function of the detail desired in the display. In a ski race, the detectors will advantageously be arranged in such a way that the average time taken by a competitor to pass between two detectors is, for example, between 2 and 10 seconds. A few tens of detectors would then be used.

Very many cables are needed to route the signals emitted by the detectors to the processing module 4. To reduce the number of connections, groups of consecutive detectors are connected to the same circuit P1, P2, ..., of the OR-ELSE gate type, each of these circuits being linked by a single cable to the processing module 4. The number of detectors connected to the same OR-ELSE circuit is chosen so that no two detectors are simultaneously active. The number of detectors per group is thus limited by the fact that it is not allowed for two competitors to be simultaneously in front of two detectors connected to the same OR-ELSE circuit and by the fact that the distance (time) between two consecutive detectors must be greater than the duration of the signal emitted by one detector, to avoid overlapping of the signals emitted by two consecutive detectors.

It should be noted that the detectors used to time competitors, that is the detectors for the start, intermediate time and finish, are preferably connected directly to the processing module 4, without passing through an OR-ELSE circuit. These detectors are also connected to the clock 6, which defines the absolute time, that is to say the reference time for the timing.

The processing module 4 is of the conventional type. It comprises a synchronous section 8 which receives the signals transmitted by the detectors and assigns to them a relative time defined by a clock 10. This information is transmitted to an asynchronous section 12, mainly consisting of a microprocessor and memorization means via the intermediary of an intermediate memory 14 of the FIFO type.

Figure 2:
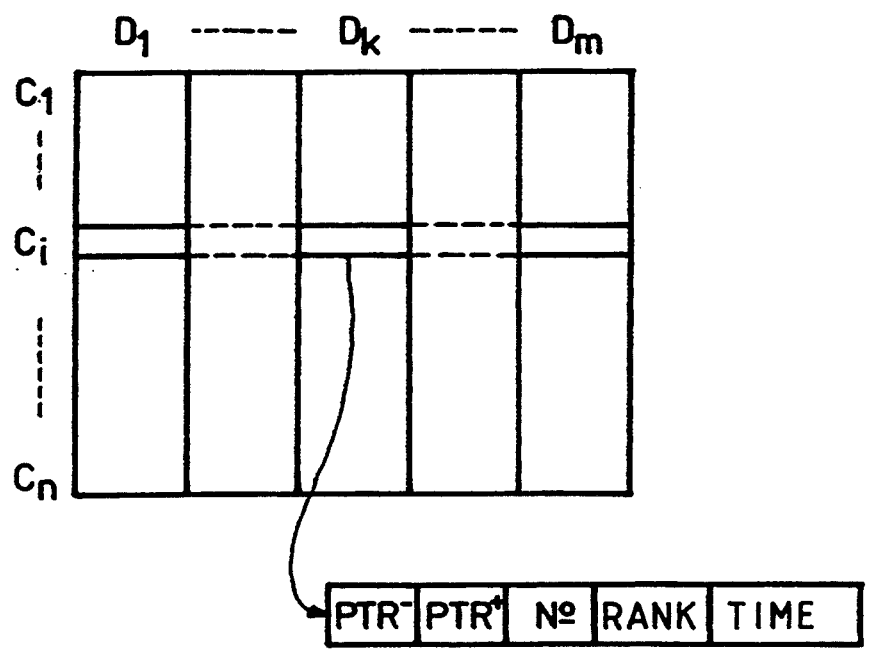
FIG. 2 shows the structure of the table in which the times when each competitor passes in front of each detector are memorized.

Data relating to the time when each competitor passes in front of each detector are stored in the memory 16 of the asynchronous section 12. These data are recorded in conventional manner in the form of a table such as shown in FIG. 2. Each column of the table corresponds to a detector $D_k$ and each line to a competitor $C_i$. Each recording is composed of 5 fields:

a rear marker PTR− and a front marker PTR+ to list competitors in conventional manner according to their ranking when passing the detector $D_k$,
the number of the competitor,
the ranking of the competitor when passing in front of the detector $D_k$, and
the time at which competitor $C_i$ passes in front of the detector $D_k$.

The time of passage in this table is the absolute time of passage calculated by the microprocessor of the asynchronous section 12 from the relative time received from, the synchronous section 8 via the memory FIFO 14 and from the absolute reference time defined by the clock 6. The ratio between the absolute time and the relative time is determined by the signal emitted by the start detector which is simultaneously transmitted to the reference clock 6 and to the synchronous section 8 of the processing module 4.

The data contained in the table 16 serve to edit the results. These are transmitted by the microprocessor of the asynchronous section 12 on the one hand to a printer 18 and on the other hand to a processing means 20 which controls the display of the results on a display table 22 located near the finishing line and, according to the invention, the display of the instantaneous ranking of a competitor by means of a picture signal generator 24.

Figure 3:
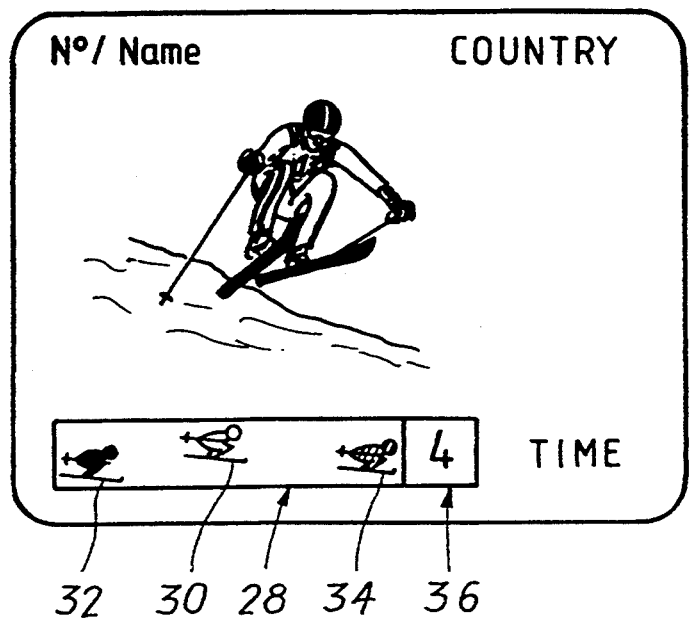
FIG. 3 illustrates a mode of displaying the instantaneous ranking of a competitor and of his position in relation to other competitors of adjacent rankings using the display system of the invention.

The signal produced by this picture signal generator is combined with the conventional television signal to form a television image such as shown in FIG. 3. The image of the competitor on the piste 26 appears in the center of the screen and the data relating to this competitor, such as his number, his name, his country and the time elapsing since the start are conventionally displayed in alphanumeric form in the upper and lower parts of the screen. The picture signal generator 24 produces a supplementary image at the bottom of the screen which is composed of a display area 28 containing a symbol 30 showing the competitor on the piste and two other symbols 32, 34 (in some cases, as will be seen from the description hereinbelow it may be that only a single symbol is visible) which represent the competitors in the rankings immediately below and immediately above the ranking of the competitor on the piste, that is the competitors indicated by the markers PTR− and PTR+ (see FIG. 2). This display area 28 can be completed by a digital area 36 containing the instantaneous ranking of the competitor on the piste.

The distances between the symbol 30 and the symbols 32, 34 represent the time differences between the competitor on the piste and the competitors of the adjacent rankings. The display system of the invention thus makes it possible to represent the relative position of the competitor on the piste in relation to these two competitors in a manner that is particularly attractive for the spectators.

The respective position of the symbols 30, 32, 34 in the display area 28 is recalculated by the processing means 20 after each passage of the competitor on the piste in front of a detector. It will thus be understood that the greater the number of detectors, the better spectators can follow the progression of the competitor on the piste in relation to his fellow contestants.

The display of the symbols 30, 32, 34 is thus effected while the competitor on the piste passes in front of each detector. When a new position of the symbols 30, 32, 34 is calculated, this new position is preferably not simply used to replace the position displayed hitherto, but the processing means 20 manages the displacement of the symbols in such a way that they slide in continuous manner from the old position displayed to the new position calculated. To obtain continuous sliding of the symbols throughout the duration of the race, it follows that it is necessary to regulate the speed of displacement of the symbols between one position and the following position in such a way that the passage between these two positions operates approximately during the time needed by the competitor on the piste to cover the distance between the current detector and the following detector.

The respective positions of the symbols 30, 32, 34 in the display area 28 are determined according to the data contained in the table of FIG. 2. The symbol 30, representing the competitor on the piste, is preferably immobile in the display area 28 and appears in the center thereof when the symbols 32 and 34, representing the competitors with the ranking immediately below and the ranking immediately above are displayed at a greater or lesser distance from the symbol 30 as a function of the time difference between the passage of the competitor on the piste and the time of passage of the competitors of adjacent rankings.

In other words, the processing means 20 converts the time differences into a distance in the display area. This conversion function is chosen as a function of the visual effect that it is desired to create in the display area. This conversion function f is preferably non-linear but converts the small time differences into distances that are comparatively larger than the distances associated with the large time differences. This effect makes it possible to display the small time differences more precisely, that is to say the situations where the competitor on the piste is very close to another competitor and there is therefore likely to be a change in his instantaneous ranking.

This effect can be achieved by a function of the conversion f defined by:

$$d = f(t) = a.\text{Log}(t)$$

where t is the time difference between two competitors and d is the corresponding distance between their symbols in the display area.

In addition, for at least one of the two symbols 32, 34, representing competitors of adjacent rankings to those of the competitor on the piste to be represented, it is appropriate to dynamically adapt the conversion function f so that, regardless of the time difference between the competitor on the piste and the competitors of adjacent rankings, the distance between the symbol 30 and one of the symbols 32, 34 in the display area is at least equal to the half length of this display area.

In other words, the value of the coefficient a of the conversion function f must be adjusted each time the instantaneous ranking of the competitor on the piste changes.

Figure 4:
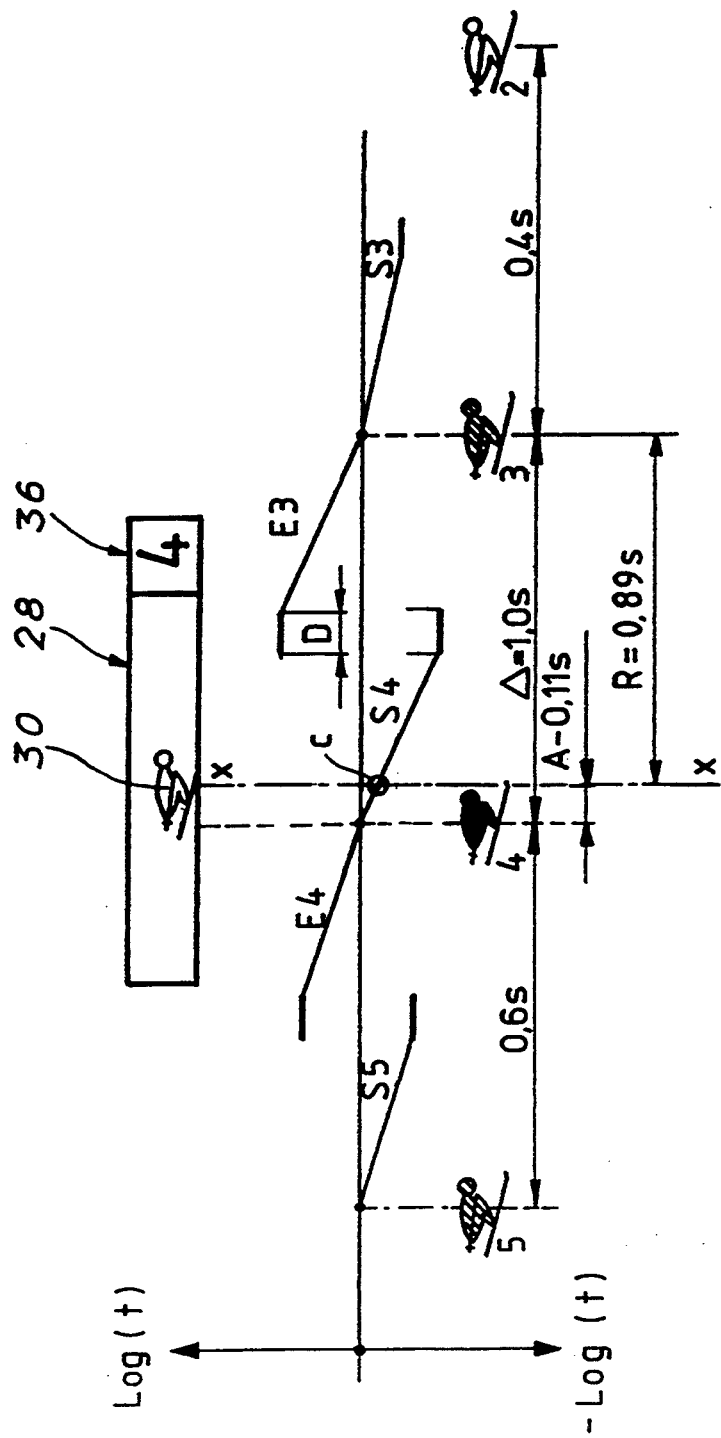
FIG. 4 illustrates the mode of calculation of the distances between the competitor on the piste and the competitors with adjacent rankings as a function of the time difference between them as they pass in front of a detector.

FIG. 4 shows in diagrammatic form how the time differences between the competitor on the piste and the competitors of adjacent rankings are converted into a distance using the function f. The instantaneous ranking of the competitor on the piste having been determined using the table of FIG. 2, (in the example shown, this ranking equals 4), the processing means 20 determines the time difference $\Delta$ between the competitors already classified in rankings 3 and 4, represented by the symbols 32 and 34 respectively, as well as the time differences R, A marking respectively the delay and lead of the competitor on the piste in relation to the two competitors of adjacent rankings. In the example shown, these time differences are equal to 1 second, 0.89 seconds and 0.11 seconds respectively. The conversion function f has two identical parts E3, S4 which constitute the entry function into the display area for the symbol 32 and the exit function out of the display area for the symbol 34. The part S4 extends from the abscissa corresponding to the position of the symbol 34 up to the middle of the space separating the symbols 32 and 34. As for the ordinate, this varies from 0 to 0.5 seconds (equal to half the time difference between the competitors of ranking 3 and 4). The part E3 is constructed symmetrically. To determine the distance between the symbol 30 and the symbols 32 and 34 in the display area, it suffices to calculate the value of the conversion function f for the abscissa corresponding to the symbol 30, that is the ordinates corresponding to this abscissa for the parts S4 and E3.

On FIG. 4, the axis xx representing the abscissa of the symbol 30 cuts the part S4 at the point c which, related to the ordinate of the graph, gives the distance between the symbol 30 and the symbol 34 in the display area. Moreover, since this axis xx does not cut the part E3, the symbol 32 does not appear in the display area.

It will be understood from the parts E3 and S4 that the symbols 32 and 34 are only simultaneously visible in the display area when the abscissa of the symbol 30 is included in the central part D of the interval $\Delta$.

The same conversion function f defined by the parts E3 and S4 is conserved as long as the instantaneous ranking of the competitor on the piste remains unchanged. In contrast, if the competitor on the piste, for example, loses a ranking, the display area will show the symbols of the competitor on the piste and of the competitors ranking 4 and 5. If the time interval between these latter equals 0.6 seconds, as shown in FIG. 4, the conversion function f is modified (alteration in scale) so as to be shown by the parts E4 and S5.

Figure 5:
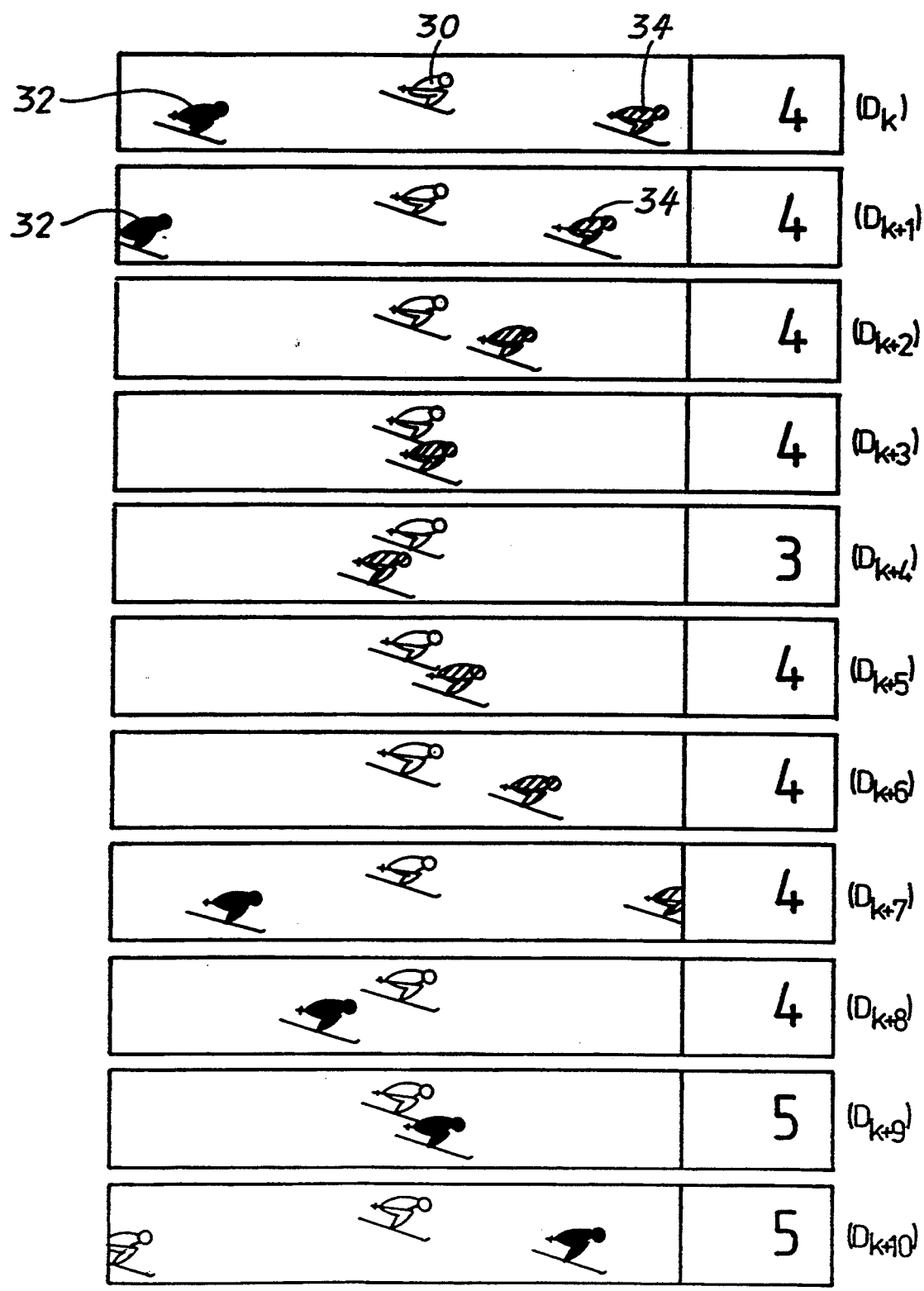
FIG. 5 shows the instantaneous content of the display area corresponding to the times when the competitor passes in front of successive detectors, $D_k$, $D_k+1$, ...

FIG. 5 illustrates the instantaneous state of the display area during the time when the competitor on the piste passes in front of successive detectors $D_k$, $D_{k+1}$, etc. As already stated hereinabove, the display of symbols in the display area is recalculated when the competitor on the piste passes in front of each detector. The new position of the symbols is preferably not displayed instantaneously, as soon as it has been calculated but they are, instead, displaced continuously between their displayed position and the new calculated positions. To give the television audience an impression of the continuous displacement throughout the race of the symbols displayed in the display area, the speed of displacement of these symbols is adjusted so that the time needed to displace the symbols from the displaced position to the new position calculated corresponds substantially to the time needed by the competitor to reach the next detector. The speed of displacement of the symbols is therefore not necessarily constant.

In this continuous display mode, the instantaneous ranking of the competitor on the piste and his position in relation to the closest fellow contestants, for a specific detector, is therefore only displayed when the competitor on the piste reaches the following detector. This presents no problem since the display in the display area is independent of the effective timing of the competitor and only serves to make it easier for spectators to follow the course of the race.

FIG. 5 illustrates a sequence in which the competitor on the piste occupies the fourth instantaneous ranking, then the third instantaneous ranking while passing in front of the detector $D_{k+4}$, then again the fourth instantaneous ranking (detector $D_{k+5}$) and finally the fifth instantaneous ranking (detector $D_{k+9}$). At each change in the ranking of the competitor on the piste, the conversion function is modified, as explained with reference to FIG. 4. In contrast, as long as the ranking of the competitor on the piste has not been changed, this function is constant; this explains that the symbol 32, representing the competitor of the ranking immediately above that of the instantaneous ranking of the competitor on the piste represented by the symbol 30, gradually disappears from the display area when his time difference from the competitor on the piste increases.

The display system of the invention is mainly devised to display the instantaneous ranking of a competitor and his position (time) in relation to the competitors of the immediately adjacent rankings at the very moment when this competitor is on the piste. However it follows that it is possible to simulate, with a delay, in other words after the competitors have finished, the instantaneous ranking of a competitor and his position (time) in relation to the competitors of immediately adjacent rankings, from a preselected list of competitors. It is also possible to disregard the times of passage in front of each detector, but only in front of a plurality of preselected detectors. It suffices for this purpose to only retain from the results table of FIG. 2 those lines and columns corresponding to specific competitors and to specific detectors and to use this sub-table as a data base for the display system.

Regardless of whether the display system is used in direct display mode or in delayed display mode, it is always possible to retain in the table or in the sub-table used only those results corresponding to non-defective detectors. Whether a detector is defective or not is determined using conventional methods by the processing module 4 and does not form part of the invention.

Finally, display according to the invention of the instantaneous ranking of a competitor can be completed by digital display of a time difference between the time of this competitor and a reference time, where this latter is for example the best time, the mean time of the other competitors, the time of the competitor of immediately lower ranking or the like.

What is claimed is:

1. A display system of the instantaneous ranking of a competitor in a race with sequential starts, said display system comprising:
    memorization means of the instant when each competitor $C_j$, $1 \leq j \leq n$, passes in front of a detector $D_k$, $1 \leq k \leq m$,
    means for classifying the competitors passing each detector to establish, for each detector, a classification list of the competitors according to their times, and
    processing means for performing the following steps when a competitor $C_i$ passes in front of a detector $D_k$:
    determining the instantaneous ranking of the competitor $C_i$ reaching the detector $D_k$ by comparing his time of passage with the times of passage of a plurality of already classified competitors,
    calculating the time differences R and A between time of passage of competitor $C_i$ and the times of passage of the competitors with immediately adjacent rankings,
    converting each time difference R and A into a calculated distance using a conversion function f, and
    displaying in a predetermined display area a symbol representing the competitor $C_i$ and at least one other symbol selected from symbols representing each of the competitors of the immediately adjacent rankings by spacing said symbols out as a function of the calculated distances.

2. A display system according to claim 1, wherein the function f is adapted dynamically, each time the ranking of the competitor $C_i$ is modified to provide a new ranking, in such a way that the time difference between the competitors of rankings immediately adjacent to the new ranking of the competitor $C_i$ defines a distance between symbols corresponding to said newly adjacent competitors which causes said corresponding symbols and the symbol of the competitor $C_i$ to be represented on a displayable length substantially equal to the length of the display area.

3. A display system according to claim 1, wherein the function f is non-linear.

4. A display system according to claim 1, wherein the function f is of the a.Log type where a is a coefficient adjusted for each competitor $C_i$ and for each detector $D_k$ as a function of the time difference between the times of passage of competitors in immediately adjacent rankings.

5. A display system according to claim 1, wherein the display area has a field in which the instantaneous ranking of the competitor $C_i$ is displayed.

6. A display system according to claim 1, wherein the processing means displaces the symbols continuously between the displayed positions corresponding to the time when the competitor $C_i$ passes in front of the detector $D_{k-1}$ and in front of the detector $D_k$.

7. A display system according to claim 6, wherein the speed of displacement of the symbols is adjusted as a function of the estimated duration between the time when competitor $C_i$ passes in front of the detector $D_{k-1}$ and the time when competitor $C_i$ passes in front of the detector $D_k$ in such a way that the position corresponding to the passage in front of the detector $D_{k-1}$ is displayed substantially at the moment when competitor $C_i$ reaches the detector $D_k$.

8. A display system according to claim 1, wherein the symbol representing the competitor $C_i$ is fixed in the display area and the symbols representing competitors of immediately adjacent rankings are mobile.

9. A display system according to claim 8, wherein the symbol representing the competitor $C_i$ is in the center of the display area.

10. A display system according to claim 1, wherein competitors not passing the finishing line are excluded from the classification lists and are not taken into account in the display.

11. A display system according to claim 1, wherein the processing means is also devised to take into account a plurality of selected detectors after the arrival of said competitors and a selected plurality of competitors, selected as from the classification lists of said competitors established for said selected detectors, and to display the instantaneous ranking of one competitor in relation to at least one other competitor of said selected plurality of competitors.

12. A display system according to claim 11 wherein display of the instantaneous ranking of a competitor is completed by a digital display of the time difference between said competitor and a reference time.

* * * * *